US009647923B2

(12) United States Patent
Subramanian et al.

(10) Patent No.: US 9,647,923 B2
(45) Date of Patent: May 9, 2017

(54) NETWORK DEVICE MOBILITY

(71) Applicant: CISCO TECHNOLOGY, INC., San Jose, CA (US)

(72) Inventors: Srinivas Subramanian, Fremont, CA (US); Rituparna Agrawal, San Jose, CA (US); Lev Shvarts, San Jose, CA (US); Johnson Leong, Belmont, CA (US); Daniel A. Alvarez, Oakland, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 45 days.

(21) Appl. No.: 14/011,356

(22) Filed: Aug. 27, 2013

(65) Prior Publication Data
US 2014/0301387 A1    Oct. 9, 2014

Related U.S. Application Data

(60) Provisional application No. 61/810,116, filed on Apr. 9, 2013.

(51) Int. Cl.
*H04W 8/12* (2009.01)
*G06F 15/173* (2006.01)
*H04L 12/751* (2013.01)

(52) U.S. Cl.
CPC .................................. *H04L 45/02* (2013.01)

(58) Field of Classification Search
CPC ... H04L 45/02; H04L 12/751; H04L 63/0272; H04L 61/609; H04W 8/12; H04W 76/022; H04W 84/005; G06F 15/173

USPC .......................................................... 370/389
See application file for complete search history.

(56) References Cited

U.S. PATENT DOCUMENTS

| 8,724,630 | B2* | 5/2014 | Xu .......................... H04L 45/64 370/392 |
| 8,762,500 | B2* | 6/2014 | Gorg ................. H04L 29/12311 709/220 |
| 2011/0261800 | A1* | 10/2011 | You .......................... H04W 8/12 370/338 |
| 2012/0173694 | A1* | 7/2012 | Yan ..................... H04L 12/4641 709/223 |
| 2012/0176936 | A1* | 7/2012 | Wu .......................... H04W 8/26 370/254 |

OTHER PUBLICATIONS

Locator ID Separation Protocol (LISP) VM Mobility Solution White Paper, 2011, Cisco.*

(Continued)

*Primary Examiner* — Edan Orgad
*Assistant Examiner* — Vanneilian Lalchinthang
(74) *Attorney, Agent, or Firm* — Patent Capital Group

(57) ABSTRACT

According to one example embodiment, an EID-NOTIFY packet is defined for use with the Location/Identifier Separation Protocol (LISP). A first-hop network element may send EID-NOTIFY responsive to decoding a data packet from a previously undetected host on its subnetwork. A site network element may receive EID-NOTIFY, and send a MAP-REGISTER message to a mapping system. EID-NOTIFY may have substantially the same format as MAP-NOTIFY. This may enable the site network element to be removed more than one hop from the subnetwork.

20 Claims, 4 Drawing Sheets

(56) References Cited

OTHER PUBLICATIONS

Cisco Systems, Inc., "Locator ID Separation Protocol (LISP) VM Mobility Solution," White Paper, © 2011, 73 pages.
Wikipedia, the free encyclopedia, "Locator/Identified Separation Protocol," [retrieved and printed Aug. 21, 2013], 5 pages; http://en.wikipedia.org/wiki/Locator/Identifier_Separation_Protocol.
Cisco Systems, Inc., "Locator Identifier Separation Protocol (LISP) Mobility Troubleshooting Guide," Jun. 10, 2012, 24 pages.
D. Faricacci, et al., "The Locator/ID Separation Protocol (LISP)," Internet Engineering Task Force (IETF), RFC 6830, Jan. 2013, 76 pages; http://tools.ietf.org/html/rfc6830.
V. Fuller, et al., "The Locator/ID Separation Protocol (LISP) Map-Server Interface," Internet Engineering Task Force (IETF), RFC 6833, Jan. 2013, 14 pages; http://tools.ietf.org/html/rfc6833.

* cited by examiner

NETWORK DEVICE MOBILITY

CROSS-REFERENCE TO RELATED APPLICATIONS

This application claims the benefit of priority under 35 U.S.C. §119(e) to U.S. Provisional Application Ser. No. 61/810,116, "DISCOVERING VIRTUAL MACHINES" filed on Apr. 9, 2013, which is hereby incorporated by reference in its entirety.

TECHNICAL FIELD OF THE DISCLOSURE

This application relates to the field of computer networking and, more particularly, to a protocol for enhancing the mobility of network devices.

BACKGROUND

A single identifier, such as an internet protocol (IP) address, can be used both to identify a networked device and to locate a device topologically in the network. The use of this single IP address is not an optimal solution, because optimization with respect to routing conflicts with optimization with respect to topology. Specifically, to efficiently route traffic, addresses should be assigned topologically. However, to effectively manage addressing without the need to reroute in response to changes in location, addresses should explicitly not be tied to topology.

RFC 6830 of the Internet Engineering Task Force (IETF) proposes a "Location/Identifier Separation Protocol" (LISP), which proposes functions that routers may use to map from Endpoint Identifiers (EIDs) to routable Routing Locators (RLOCs), where EIDs are not globally routable. EIDs may be in different forms for different implementations of LISP, and several such forms are known in the art. For example, EIDs may look like IPv4 IP addresses, IPv6 IP addresses, or MAC addresses by way of non-limiting example. RLOCs are assigned to first-hop routers servicing a subnetwork, and are used for routing and forwarding packets throughout a larger network. EIDs, in contrast, are assigned to hosts on the subnetwork independent of network topology, and may globally uniquely identify a particular host. However, EIDSs may not be used for routing purposes. Rather, LISP provides methods for mapping between RLOCs and EIDs, and for encapsulating traffic originated by devices using non-routable EIDs for transport across a network infrastructure that routes and forwards using RLOCs.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION

Overview

Figure 1:
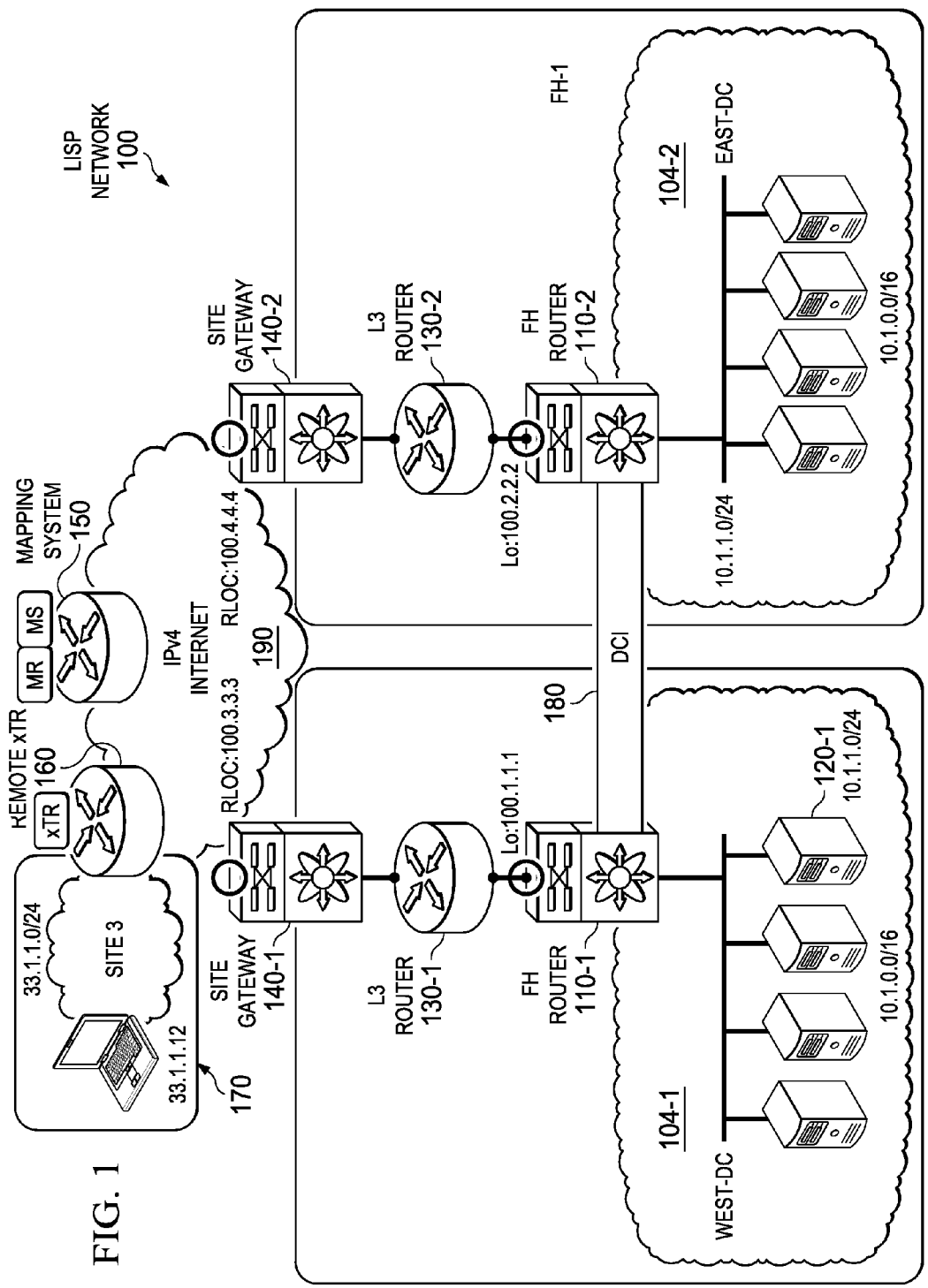
FIG. 1 is a block diagram of a LISP network according to various aspects of the present specification.

In one example embodiment, there is disclosed a method performed by a first network element comprising identifying an endpoint machine communicatively coupled to the first network element, the endpoint machine having an associated endpoint identifier (EID). The term 'EID' can include any identifier, symbol, or data segment that could be applicable in such a context or used in such an environment. The method can also include sending an EID-NOTIFY message incorporating the EID, the EID-NOTIFY message configured to inform a second network element (e.g., a router) that the endpoint machine is communicatively coupled to the first network element, where the second router is configured to provide Location/Identifier Separation Protocol (LISP) encapsulation or decapsulation. Note that the term 'sending' is broad and includes any activity associated with transmitting, communication, directing, forwarding, propagating, etc.

In another example embodiment, there is disclosed a first-hop router comprising a network interface; a processor; and a memory having stored thereon executable instructions configured to instruct the processor to: receive a packet on the network interface from an endpoint host, the packet comprising an endpoint identifier (EID) associated with the endpoint host; format an EID-NOTIFY message, including the EID and a type value identifying the message as an EID-NOTIFY message; and forward the EID-NOTIFY message to a site gateway router. Note that the term 'forward' is interchangeable with the term 'send' as used herein in this Specification.

In yet another example embodiment, there is disclosed a first-hop router comprising a network interface; a processor; and a memory having stored thereon executable instructions configured to instruct the processor to: receive a packet on the network interface from an endpoint host, the packet comprising an endpoint identifier (EID) associated with the endpoint host; format an EID-NOTIFY message, including the EID and a type value identifying the message as an EID-NOTIFY message; and forward the EID-NOTIFY message to a site network element.

Detailed Description of Example Embodiments

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiment many have different advantages, and no particular advantage is necessarily required of any embodiment.

According to the present proposed specification, RLOCs and EIDs are structurally similar to IP addresses, although neither is functionally interchangeable with an IP address. Rather, the EID and the RLOC together provide the same functionality previously provided by the IP address. According to one example embodiment of the present disclosure, a modification to LISP is disclosed, where EID detection is decoupled from LISP encapsulation and decapsulation (ENDEC). In this embodiment, a first-hop router (FHR) is provided one hop away from endpoint hosts, and is configured to perform EID detection, but need not be configured to perform ENDEC. Rather, a second router, such as a site gateway router (SGR) may be provided to perform LISP ENDEC. The SGR may be an arbitrary number of hops away from the FHR, and an arbitrary number of devices may be disposed in between the two. Upon detection of a new endpoint host connected to its subnetwork, the FHR provides to the SGR a novel EID-NOTIFY message, which provides routing information for the new endpoint host. The SGR then communicates with a mapping system and with external xTRs as though it were connected in a single hop from the endpoint host.

FIG. 1 is a block diagram of an example LISP network 100 implementing device mobility according to one example embodiment of the present disclosure. In this embodiment, a first data center 104-1 includes a plurality of machines, which may be for example virtual machines or physical hosts. Throughout the remainder of this example, the machines can be referred to and treated as virtual machines (VMs) 120, though it should be recognized that other configurations are easily substitutable. In this embodiment, VM 120-1 is assigned EID 10.1.1.0/24.

First data center 104-1 may be for example a west data center, while a second data center 104-2 may be an east data center. In this embodiment, west data center 104-1 has RLOC 100.3.3.3, and east data center 104-2 has RLOC 100.4.4.4. Like west data center 104-1, east data center 104-2 may include a plurality of VMs 120. Each data center 104 is serviced by one or more first-hop routers (FHR) 110. In the example embodiment, FHRs 110 are not configured as full LISP routers. In this example, FHRs 110 are configured to provide dynamic EID detection services, but need not provide LISP encapsulation/decapsulation (ENDEC) services. In this context, dynamic EID detection indicates that VMs 120 are "mobile": they can move between data centers 104. Each data center 104 is also serviced by a Site Gateway Router (SGR) 140, which provides a gateway between a data center 104 and the broader internet 190, which in this example is treated as operating on IPv4, according to current practice. FHRs 110, SGRs 140, VMs 120, and other servers, hosts, and computing devices described herein may be Von Neuman machines, such as are well known in the art, including a processor, memory, and network interface. In some cases, a Von Neuman machine may be a virtual machine, in which case hardware elements are provided by a virtualization layer, but are functionally interchangeable with physical hardware.

It should be recognized that an internet operating on another principle, such as IPv6 or later, can easily be used. SGRs 140 are configured to provide LISP ENDEC services, but need not provide EID detection, as EID detection is provided by FHRs 110. In some embodiments, SGRs may be blocked from providing EID detection, as the current LISP specification requires EID detection to be performed at the first hop from virtual machines 120. In this embodiment, FHR 110-1 is assigned local IP address 100.1.1.1 and FHR 110-2 is assigned local address 100.2.2.2. Further, in some embodiments, a Data Center Interconnect (DCI) 180 may be provided, for example overlay transport virtualization (OTV), advanced virtual private LAN service (A-VPLS), or fiber.

Between SGR 140 and FHR 110 there may be a number of intermediate routers, such as network layer 3 (L3) routers 130. L3 routers 130 may be for example intermediate routers, firewalls, gateways, or other intermediate network devices. In this example embodiment, virtual machines 120 are removed more than one hop from SGRs 140 via FHRs 110 and L3 routers 130. Furthermore, L3 routers 130 may not be LISP capable, which means that traffic passing between SGR 140 and FHR 110 should be in native IPv4 format.

SGRs 140 are also communicatively coupled to a mapping system 150 via internet 190. Mapping system 150 is a distributed database that maps EIDs to one or more RLOCs (in some embodiments, an EID may be accessible from more than one SGR 140), and is conceptually similar to a DNS server. Internet 190 also is communicatively coupled to a remote LISP network 170, which is serviced by a remote egress/ingress tunneling router (xTR) 160. Remote LISP network 170 and remote xTR 160 may be based on LISP implementations, illustrating that a LISP implementation according to the present disclosure is backward compatible with LISP systems. In one example embodiment, SGRs 140 are modified xTRs, performing all xTR functions except for EID detection. Thus, each SGR 140 maintains a local database of all EIDs it believes are reachable through its subnet.

Figure 2:
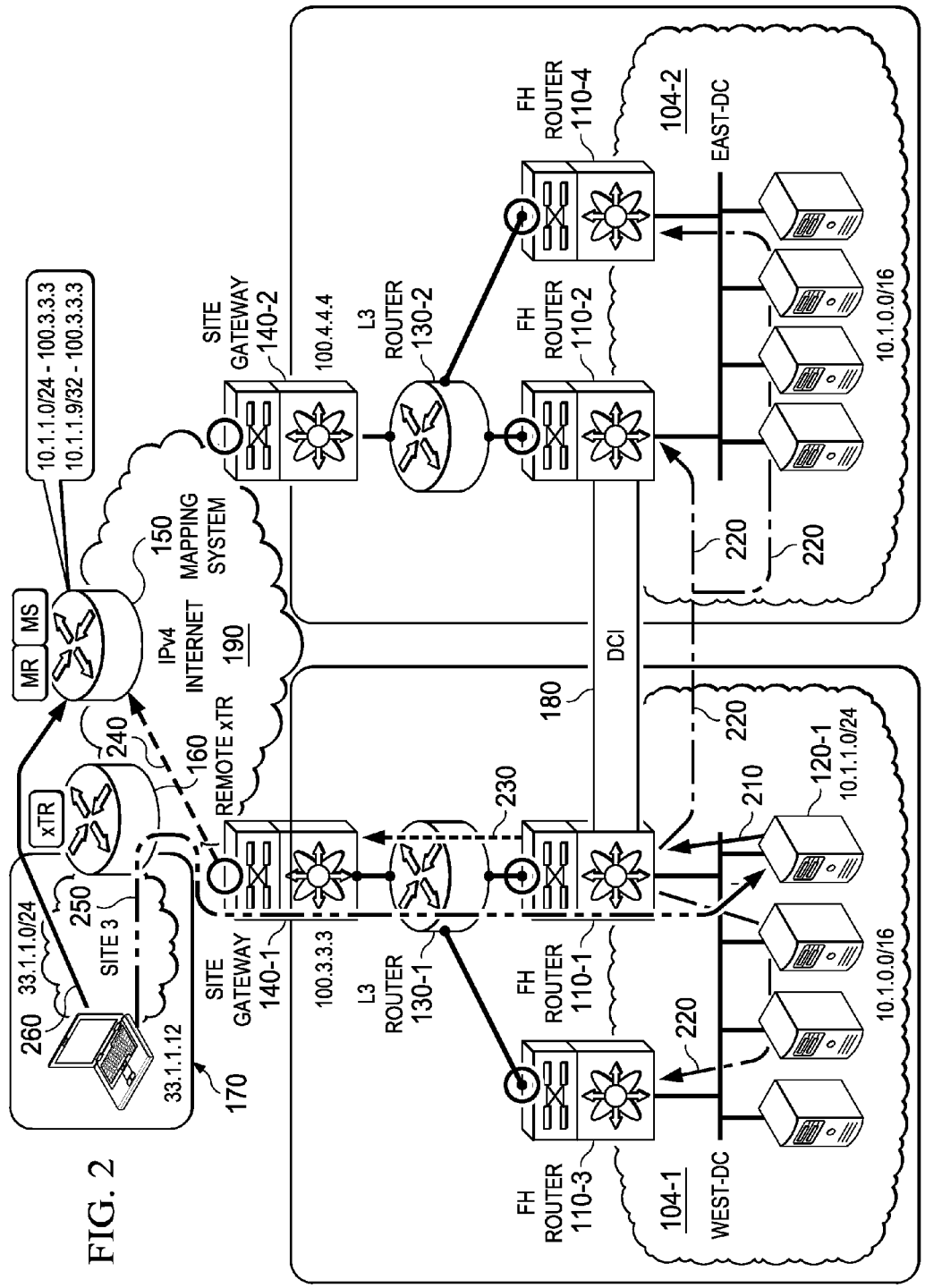
FIG. 2 is a block diagram of the LISP network, disclosing additional functionality according to various aspects of the present specification.

As illustrated in FIG. 2, transaction 210 (dynamic EID detection) occurs when a virtual machine 120, such as VM 120-1 sends a packet on its subnet after being newly connected to west data center 104-1. FHR 110-1 receives the packet and detects virtual machine 120-1's IP address, which also functions as the EID for virtual machine 120-1. FHR 110-1 then performs transaction 220 (a multicast MAP-NOTIFY message), which is received by FHRs 110-2, 110-3, and 110-4. The MAP-NOTIFY message informs the other FHRs 110 that FHR 110-1 has mapped VM 120-1 to itself. FHR 110-1 then multicasts transaction 230, a message called EID-NOTIFY for any SGRs 140 servicing the network.

In this case, SGR 140-1 is the only SGR servicing the network, so it is the only SGR 140 that can receive the message. Because the EID-NOTIFY message is encoded as a LISP Encapsulated Control Message (ECM), it is transparent to L3 routers 130. In one example embodiment, the EID-NOTIFY message, which is described with more particularity in FIG. 4, includes the EID of VM 120-1 and the RLOC of FHR 110-1 (100.1.1.1). SGR 140-1 then sends transaction 240, a standard MAP-REGISTER message to mapping system 150 to notify mapping system 150 that SGR 140-1's RLOC is now the correct mapping for virtual machine 120-1's EID. If remote xTR 160 has not previously serviced requests for VM 120-1, it can send transaction 260, a MAP-REQUEST query, to mapping system 150. Mapping system 150 can notify external xTR 160 of the correct mapping for VM 120-1, and external xTR 160 then sends transaction 250, a LISP data packet directed to VM 120-1.

Figure 3:
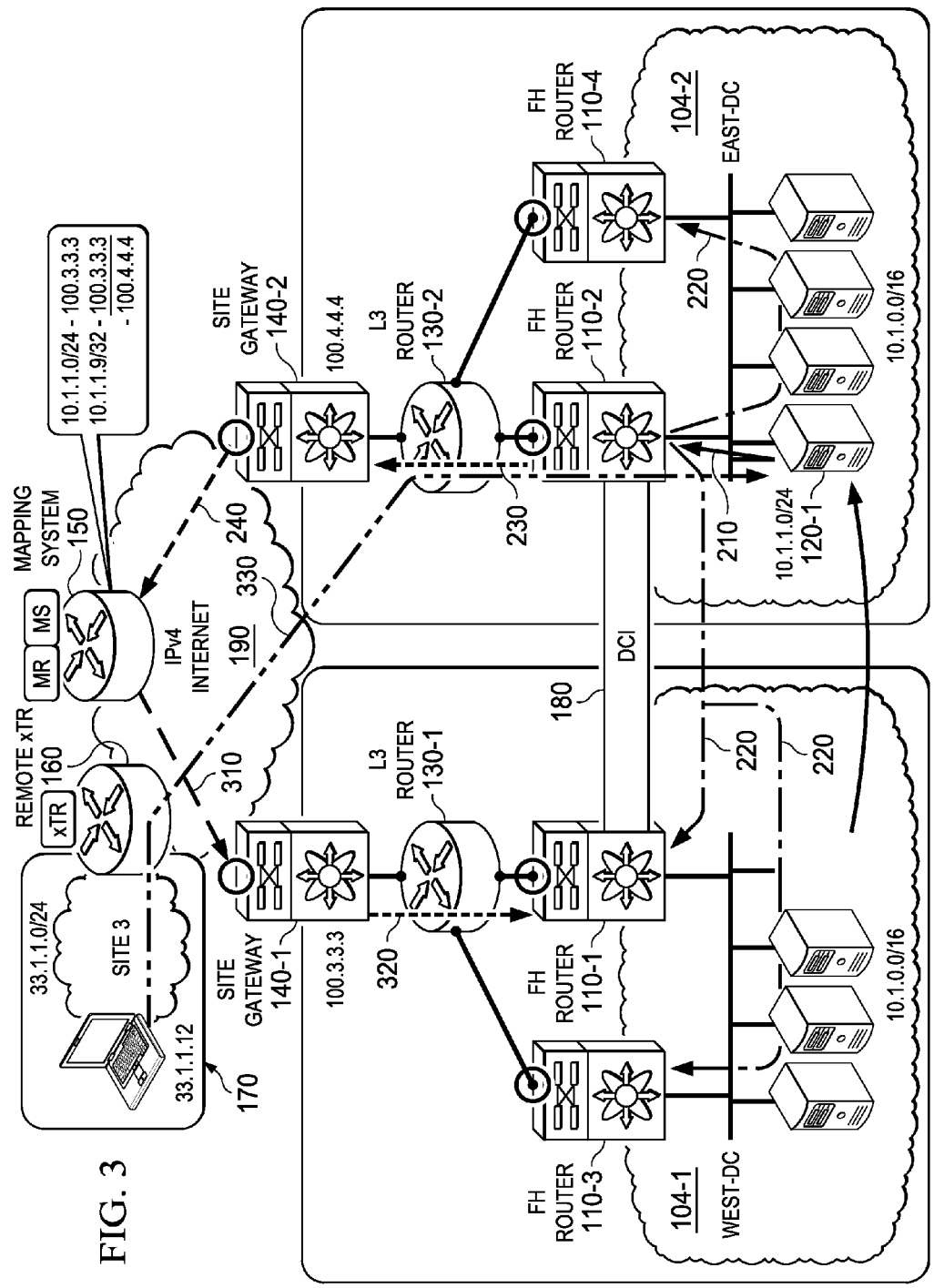
FIG. 3 is a block diagram of the LISP network, disclosing additional functionality according to various aspects of the present specification.

In FIG. 3, VM 120-1 has been moved from west data center 104-1 to east data center 104-2. In this case, west SGR 140-1 may not yet know that VM 120-1 has disconnected from its subnet. However, once VM 120-1 sends a packet (transaction 210), east FHR 110-2 decodes the packet according to the method described above. Further following the method described above, FHR 110-2 multicasts MAP-NOTIFY 220, FHR 110-2 sends EID-NOTIFY 230 to SGR 140-2, and SGR 140-2 sends MAP-REGISTER 240. Mapping system 150 then sends a second MAP-NOTIFY 310, directed to both SGR 140-1 and SGR 140-2, informing them that VM 120-1 is now connected to SGR 140-2. SGR 140-1 then removes VM 120-1 from its internal routing table. Finally, SGR 140-1 sends a special EID-NOTIFY message 320 to FHR 110-1. EID-NOTIFY 320 includes the EID for VM 120-1 appended to a zeroed-out RLOC (such as "0.0.0.0"). This instructs FHR 110-1 to remove VM 120-1 from its internal routing table.

When external xTR 160 tries to communicate with VM 120-1 again, it incorrectly believes that its internal routing table is up-to-date. Thus, xTR 160 sends a data packet to SGR 140-1. In response, SGR 140-1 sends a LISP SOLICIT-MAP-REQUEST message 330, which informs xTR 160 that VM 120-1 is no longer connected to SGR 140-1. xTR 160 then sends MAP-REQUEST 260 to mapping system 150, which provides xTR 160 with the correct routing information for VM 120-1.

Figure 4:
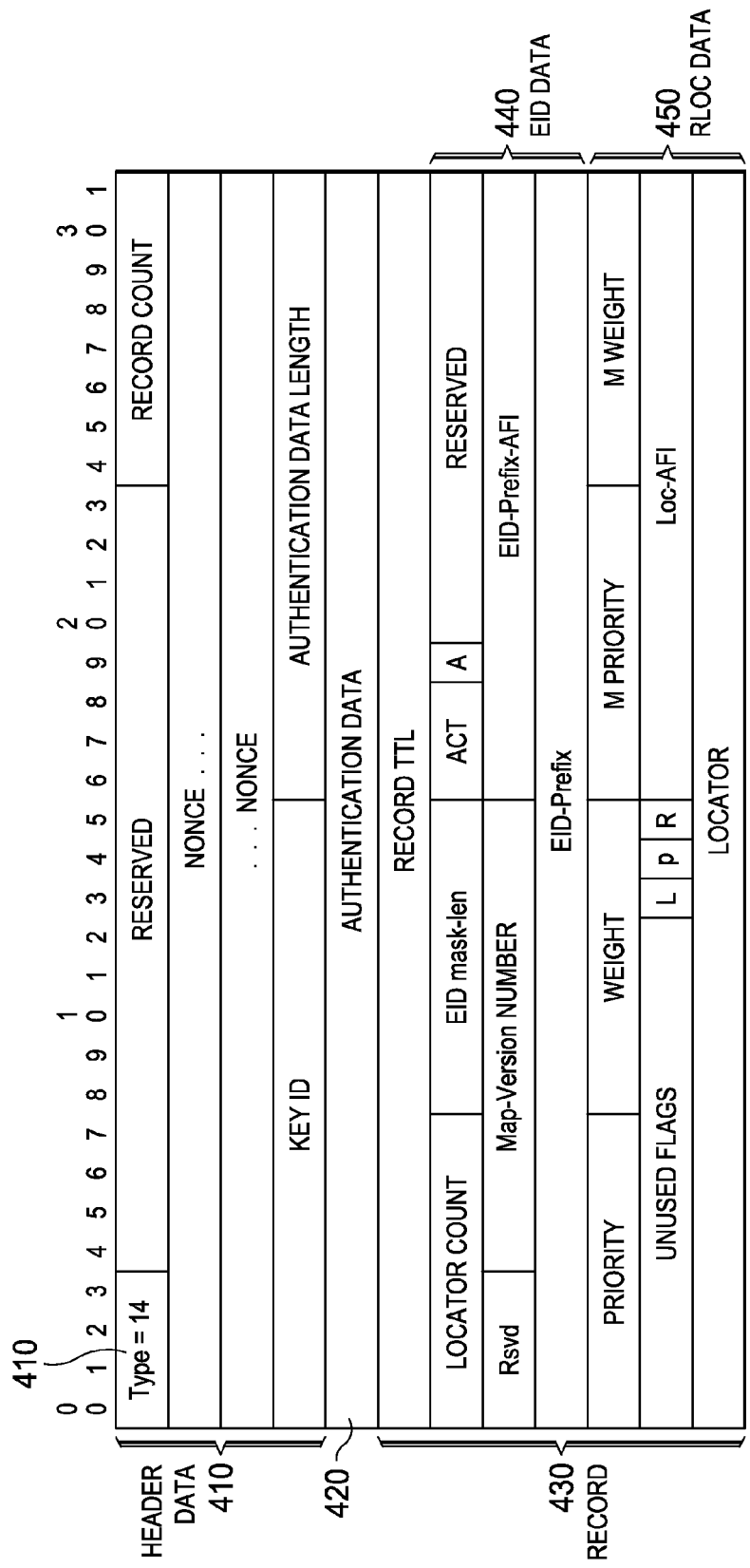
FIG. 4 is a block diagram of an EID-NOTIFY message according to various aspects of the present specification.

FIG. 4 is a block diagram of an example EID-NOTIFY message in accordance with the present disclosure. In this embodiment, EID-NOTIFY has a format similar to the MAP-NOTIFY message, which is described in RFC 6830, section 6.1.7. Specifically, EID-NOTIFY is a 32-bit structure with at least twelve data words. The first four data words are header data 410, including bits 0-3 of the first word, which in the example embodiment is type identifier 410. In this embodiment, type identifier 410 has the value "1110" (14 decimal). Following the header data, there is an authentication data field 420, which has a variable number of data words. Following authentication data field 420 is record 430, which is seven words long. Record 430 includes EID data 440 and RLOC data 450. Additional data field details are in accordance with RFC 6830, as described above.

Turning to the infrastructure associated with the present disclosure, LISP network 100 can represent any series of points or nodes of interconnected communication paths for receiving and transmitting packets of information that propagate through the communication system. LISP network 100 offers a communicative interface between any endpoints and/or other network elements (e.g., routers, data centers, etc.), and may be any local area network (LAN), Intranet, extranet, wireless local area network (WLAN), metropolitan area network (MAN), wide area network (WAN), virtual private network (VPN), or any other appropriate architecture or system that facilitates communications in a network environment. LISP network 100 may implement a UDP/IP connection and use a TCP/IP communication protocol in particular embodiments of the present disclosure. However, LISP network 100 may alternatively implement any other suitable communication protocol for transmitting and receiving data packets within the communication system. LISP network 100 may foster any communications involving services, content, video, voice, or data more generally, as it is exchanged between end users and various network elements.

In one example implementation, any one or more of the 'network elements' in the FIGURES (e.g., site gateways 140-1, 140-2, first hop routers 110-1-4, and L3 routers 130-1, 130-2, etc.) may include respective processors, respective memory elements, and respective modules, which may control many of the mobility access activities discussed herein. In one particular instance, these network elements can be configured to exchange data in a network environment such that the intelligent mobility access functionalities discussed herein are achieved. As used herein in this Specification, the term 'network element' is meant to encompass various types of routers, switches, gateways, bridges, load-balancers, firewalls, servers, inline service nodes, proxies, processors, modules, or any other suitable device, component, element, or object operable to exchange information in a network environment. The network element may include appropriate processors, memory elements, hardware and/or software to support (or otherwise execute) the activities associated with using a processor for mobility access functionalities, as outlined herein. Moreover, the network element may include any suitable components, modules, interfaces, or objects that facilitate the operations thereof. This may be inclusive of appropriate algorithms and communication protocols that allow for the effective exchange of data or information.

In a specific implementation, these network elements include software to achieve (or to foster) the mobility access operations, as outlined herein in this document. Furthermore, in one example, the network elements can have an internal structure (e.g., have a processor, a memory element, etc.) to facilitate some of the operations described herein. In other embodiments, all of these mobility access features may be provided externally to these elements or included in some other network element to achieve this intended functionality. Alternatively, any other network element can include this software (or reciprocating software) that can coordinate with the network elements in order to achieve the operations, as outlined herein.

Note that in certain example implementations, the mobility access functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof. Each network element can also include suitable interfaces for receiving, transmitting, and/or otherwise communicating data or information in a network environment.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 USC section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

What is claimed is:

1. A method to be performed by a first network element, comprising:
    identifying an endpoint machine communicatively coupled to the first network element, the endpoint machine having an associated endpoint identifier (EID); and
    without performing a Location/Identifier Separation Protocol (LISP) encapsulation or decapsulation, sending an EID-NOTIFY message including the EID and a routing locator (RLOC) of the first network element, the EID-NOTIFY message configured to inform a second network element the endpoint machine is communicatively coupled to the first network element.

2. The method of claim 1, wherein the second network element is configured to provide LISP encapsulation or decapsulation.

3. The method of claim 1, wherein sending the EID-NOTIFY message comprises providing the message on a control plane.

4. The method of claim 1, wherein the EID-NOTIFY message is a LISP encapsulated control message.

5. The method of claim 1, wherein the EID-NOTIFY message has substantially the same form as a LISP MAP-NOTIFY message.

6. The method of claim 1, wherein the EID-NOTIFY message includes a LISP type value of fourteen.

7. The method of claim 1, further comprising:
receiving an EID-CONTROL message; and
sending a MAP-REGISTER message.

8. The method of claim 7, wherein sending the EID-CONTROL message comprises multicasting the EID-CONTROL message.

9. A first-hop network element, comprising:
a network interface;
a processor; and
a memory having stored thereon executable instructions configured to instruct the processor to:
receive a packet on the network interface from an endpoint host, the packet comprising an endpoint identifier (EID) associated with the endpoint host;
format an EID-NOTIFY message, including the EID, a routing locator (RLOC) of the first-hop network element, and a type value identifying the message as an EID-NOTIFY message; and
without performing a Location/Identifier Separation Protocol (LISP) encapsulation or decapsulation, forward the EID-NOTIFY message to a site gateway router, wherein the site gateway router is located two or more hops from the endpoint host.

10. The first-hop network element of claim 9, wherein the instructions are further configured to instruct the processor to add the EID to a local routing database.

11. The first-hop network element of claim 9, wherein the EID-NOTIFY message is a LISP encapsulated control message.

12. The first-hop network element of claim 11, wherein the EID-NOTIFY message has substantially the same format as a LISP MAP-NOTIFY message.

13. The first-hop network element of claim 11, wherein the EID-NOTIFY message has a LISP type value of fourteen.

14. The first-hop network element of claim 11, wherein the first-hop network element is not configured to perform LISP encapsulation and decapsulation.

15. A site network element, comprising:
a processor;
a network interface; and
a memory having stored thereon a routing table and software instructions configured to instruct the processor to:
receive an incoming EID-NOTIFY message on the network interface, the EID-NOTIFY message including an endpoint identifier (EID) for a host connected to a subnetwork of the site network element and a routing locator (RLOC) of the first-hop router, wherein the host is located two or more hops from the site network element; and
without performing a Location/Identifier Separation Protocol (LISP) encapsulation or decapsulation, send an outgoing MAP-REGISTER message on the network interface.

16. The site network element of claim 15, wherein sending the outgoing MAP-REGISTER message on the network interface comprises multicasting the MAP-REGISTER message.

17. The site network element of claim 15, wherein the EID-NOTIFY message is a LISP encapsulated control message.

18. The site network element of claim 15, wherein the EID-NOTIFY message has substantially the same format as a LISP MAP-NOTIFY message.

19. The site network element of claim 15, wherein the EID-NOTIFY message includes a LISP type value of fourteen.

20. The site network element of claim 15, wherein the EID-NOTIFY message is received on the network interface over a LISP control plane.

* * * * *